(12) United States Patent
Nguyen et al.

(10) Patent No.: US 8,204,337 B2
(45) Date of Patent: Jun. 19, 2012

(54) IMAGE PROCESSING SYSTEM AND METHOD FOR NOISE REDUCTION

(75) Inventors: Khang Nguyen, Osaka (JP); Yusuke Monobe, Kyoto (JP); Yusuke Tanji, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/057,046

(22) PCT Filed: May 13, 2010

(86) PCT No.: PCT/JP2010/003234
§ 371 (c)(1),
(2), (4) Date: Feb. 1, 2011

(87) PCT Pub. No.: WO2010/140302
PCT Pub. Date: Dec. 9, 2010

(65) Prior Publication Data
US 2011/0135219 A1 Jun. 9, 2011

(30) Foreign Application Priority Data
Jun. 4, 2009 (JP) ................................. 2009-135594

(51) Int. Cl.
*G06K 9/40* (2006.01)
*G06K 9/36* (2006.01)
*G06K 9/46* (2006.01)
*H04N 5/00* (2011.01)

(52) U.S. Cl. ......... 382/275; 382/236; 348/607; 348/608

(58) Field of Classification Search ................ None
See application file for complete search history.

(56) References Cited

U.S. PATENT DOCUMENTS
6,122,314 A 9/2000 Brüls et al.

2003/0122967 A1* 7/2003 Kondo et al. ............ 348/607
2004/0264802 A1 12/2004 Kondo
2007/0092145 A1 4/2007 Shimizu
(Continued)

FOREIGN PATENT DOCUMENTS
JP 8-163410 6/1996
(Continued)

OTHER PUBLICATIONS

J. M. Boyce, "Noise reduction of image sequences using adaptive motion compensated frame averaging", ICASSP 1992.*
(Continued)

*Primary Examiner* — Li Liu
(74) *Attorney, Agent, or Firm* — Wenderoth, Lind & Ponack, L.L.P.

(57) ABSTRACT

To provide an image processing apparatus which reduces, using a temporal noise removal scheme, image block distortion or noise and temporal flickering and fluctuation phenomena. The image processing apparatus (1) removing noise in an input image by adding a reference image to the input image includes a motion estimation unit (20) which generates motion information indicating a motion estimated for the input image; a motion compensation unit (30) which generates a after motion compensation second image corresponding to a before motion compensation first image by performing motion compensation using the generated motion information; a flatness degree calculation unit (40) which calculates a flatness degree of the input image; a blending rate calculation unit (53) which calculates addition rates for the input image, first image, and second image, using the calculated flatness degree; and a pixel addition unit (60) which adds the respective images according to the addition rates.

10 Claims, 10 Drawing Sheets

U.S. PATENT DOCUMENTS

2008/0002063 A1* 1/2008 Kimura et al. ............... 348/607
2008/0291300 A1* 11/2008 Hitomi et al. ............... 348/241

FOREIGN PATENT DOCUMENTS

| | | |
|---|---|---|
| JP | 11-504490 | 4/1999 |
| JP | 2004-328635 | 11/2004 |
| JP | 2007-122232 | 5/2007 |
| JP | 3960258 | 5/2007 |

OTHER PUBLICATIONS

E. Dubois, S. Sabri, "Noise reduction in image sequences using motion-compensated temporal filtering", IEEE Trans. on Communications, 1984.*

International Search Report issued Jun. 22, 2010 in corresponding International Application No. PCT/JP2010/003234.

* cited by examiner

IMAGE PROCESSING SYSTEM AND METHOD FOR NOISE REDUCTION

TECHNICAL FIELD

The present invention relates to image processing apparatuses capable of removing noise in input images and thereby suppressing flickering and fluctuation in resulting output images.

BACKGROUND ART

With increase in camera speed and refinement of imaging elements, it has become difficult to ensure sufficient amounts of exposure at the time of image capturing. For this reason, captured images include a lot of noise. Here, the noise in these images can be removed by signal processing. This noise removal can be roughly classified into spatial filtering and temporal noise removal.

Noise removal using a spatial filter has problems that edges in an image are blurred in most cases and the saturation may decrease. On the other hand, temporal noise removal makes it possible to suppress the problems that occur in the noise removal using such a spatial filter and effectively removing noise.

Some exemplary conventional temporal noise removal schemes are intended to remove noise by adding plural images in the time direction. Some of the temporal noise removal schemes use motion compensation, and the others do not use motion compensation.

FIG. 11 is a functional block diagram showing a functional structure of a conventional image processing apparatus which performs a temporal noise removal scheme without using motion compensation.

As shown in FIG. 11, the image processing apparatus 70 includes a memory 71, an addition rate calculation unit 75, and a pixel addition unit 76.

First, the addition rate calculation unit 75 calculates addition rates using the input image and a reference image stored in the memory 71. Based on these addition rates, the pixel addition unit 76 adds the pixels of the input image and the pixels of the reference image.

Random noise in the input image is different from random noise in the reference image. For this reason, the random noise is statistically cancelled (the random noise is temporally smoothed) by adding the input image and the reference image. This reduces the random noise.

However, this scheme has a problem that, when there is a motion of a subject between the input image and the reference image, such pixel addition produces a residual image in the resulting output image.

FIG. 12 is a functional block diagram showing a functional structure of a conventional image processing apparatus which performs a temporal noise removal scheme using motion compensation.

As shown in FIG. 11, the image processing apparatus 70 includes a memory 71, a motion estimation unit 72, a motion compensation unit 73, an addition rate calculation unit 75, and a pixel addition unit 76.

First, the motion estimation unit 72 performs motion estimation using the input image and the reference image stored in the memory 71 to determine the positions of corresponding blocks in the reference image with respect to the respective blocks in the input image. Next, the motion compensation unit 73 generates block images of the reference image at the positions corresponding to the respective blocks in the input image according to the motion information estimated by the motion estimation unit 72. The addition rate calculation unit 75 calculates the addition rates using the input image and the reference image after motion compensation.

Next, the pixel addition unit 76 reduces, based on the addition rates, the noise by adding the pixels of the input image and the pixels of the reference image after motion compensation. In this way, the pixel addition unit 76 can reduce random noise in an image of a subject that makes the motion without producing any residual image in the resulting output image, by using the reference image after motion compensation.

However, there are cases where this scheme is not sufficient to perform accurate motion estimation due to influence of noise in images. In such a case, an image region at the non-correspondence positions is added, which causes an adverse effect that especially still regions look fluctuating in resulting output images.

Furthermore, some of temporal noise removal schemes combine a scheme without using motion compensation and a scheme using motion compensation (for example, see PTL (Patent Literature) 1).

FIG. 13 is a functional block diagram showing a functional structure of a conventional image processing apparatus which performs a temporal noise removal scheme that is a combination of a scheme without using motion compensation and a scheme using motion compensation.

As shown in FIG. 13, the image processing apparatus 70 includes a memory 71, a motion estimation unit 72, a motion compensation unit 73, a pixel addition unit 76, a selection control unit 77, and a reference image setting unit 78.

First, the motion estimation unit 72 and the motion compensation unit 73 perform motion estimation and motion compensation, respectively, as in the descriptions given with reference to FIG. 12. Next, the selection control unit 77 performs motion estimation using the input image and the reference image, and discriminates motion regions and motionless regions, based on the result of the estimation.

Next, the reference image setting unit 78 selects a reference image for each of the motion regions and motionless regions. More specifically, the reference image setting unit 78 selects, for each motion region, a reference image after motion compensation, and selects, for each motionless region, a reference image before motion compensation.

Next, the pixel addition unit 76 adds the pixels of the input image and the pixels of the reference image. In this way, random noise is temporally smoothed so as to reduce noise. Furthermore, selecting a reference image based on presence/absence of a motion in the input image reduces noise without producing a residual image even in a motion region.

CITATION LIST

Patent Literature

[PTL 1]
Japanese Patent Application Publication No. 3960258

SUMMARY OF INVENTION

Technical Problem

However, there are cases where it is impossible to accurately detect a motion vector in an image including much noise because it is impossible to discriminate a signal and noise. In such a case, a reference image after motion compensation does not correspond to an input image. In addition, motion compensation is performed in units of a block, and thus processing using such a non-correspondence image produces block distortion in the reference image after motion compensation.

Accordingly, it is impossible to accurately estimate a motion vector in such an image including much noise according to the conventional processing so as to generate a block after motion compensation corresponding to a block in the input image. This produces a problem that the resulting image has an image quality degraded due to block distortion.

Furthermore, motion compensation is also performed in units of a block, and thus an image after motion compensation includes block noise at boundaries between portions having mutually different motion amounts. In other words, the image after motion compensation includes block distortion at each boundary between a still region and a moving region. Additionally, such block distortion is caused also at the boundary between moving regions when a change is made in the motion amount.

Furthermore, when a switch is made between a reference image before motion compensation and reference image after motion compensation in selecting a reference image, a sudden change appears as a discontinuous portion in the resulting output image.

In this way, the conventional schemes have a problem of image degradation resulting from block distortion or discontinuous portions that appear in an image. In addition, when a video or temporally consecutive images are processed, the resulting output video may suffer flickering and fluctuation phenomena because quality-degraded portions change from image to image. Such flickering and fluctuation phenomena include flickering that occurs in temporally consecutive images or fluctuation at the same portions of a subject.

The present invention is intended to solve the above-described problems, and has an object to provide image processing apparatuses capable of reducing block distortion and flickering and fluctuation phenomena in time direction in resulting output images when reducing noise in images using temporal noise removal schemes.

Solution to Problem

In order to achieve the above-described object, an image processing apparatus according to the present invention includes a motion estimation unit configured to generate motion information indicating a motion estimated for the input image; a motion compensation unit configured to generate a second image corresponding to a first image by performing motion compensation using the generated motion information, the second image being a reference image after motion compensation, and the first image being a reference image before motion compensation; a flatness degree calculation unit configured to calculate a flatness degree of the input image; a rate calculation unit configured to calculate addition rates for the input image, the first image, and the second image, using the calculated flatness degree; and a pixel addition unit configured to generate an image that is to be an output image by adding the input image, the first image, and the second image according to the addition rates calculated for the respective images that are the input image, the first image, and the second image.

In this way, the addition rates for the input image, reference image before motion compensation, and reference image after motion compensation are calculated using the flatness degree of the input image, and these images are added according to the addition rates. Here, there is a tendency that motion estimation can be accurately performed when the flatness degree is low. Therefore, it is possible to calculate the addition rates using the magnitude of the flatness degree as an indicator as to whether motion estimation can be accurately performed. Since the reference image before motion compensation and the reference image after motion compensation are added to the input image according to the addition rates calculated based on the flatness degree, no sudden change occurs in the images although such a sudden change is caused when the reference image to be added to the input image is switched between the reference image before motion compensation and the reference image after motion compensation. As described above, the image processing apparatus according to the present invention can reduce block distortion around the boundaries between the blocks subjected to motion compensation in images when reducing noise in the images using a temporal noise removal scheme, and thereby obtaining output images having an excellent image quality. Since no sudden change occurs in the temporally consecutive images, flickering and fluctuation phenomena can be reduced.

In addition, it is preferable that the flatness degree calculation unit is configured to calculate the flatness degree of the input image such that the flatness degree becomes higher as a pixel value variation or an edge amount of the input image becomes smaller.

In this way, a flatness degree is calculated based on either a pixel value variation or an edge amount. For this reason, it is possible to calculate the flatness degree easily and reduce block distortion and flickering and fluctuation phenomena in the time direction in output images.

In addition, it is preferable that the rate calculation unit is configured to calculate the addition rates for the respective images such that the addition rate for the first image becomes higher and the addition rate for the second image becomes lower as the flatness degree becomes higher, and that the addition rate for the first image becomes lower and the addition rate for the second image becomes higher as the flatness degree becomes lower.

In this way, the degree of motion compensation is set lower as the flatness degree is higher, and the degree of motion compensation is set higher as the flatness degree is lower. Since motion estimation can be performed more accurately in a region that is less flat, the degree of motion compensation is set higher as the flatness degree is lower. In this way, it is possible to appropriately reflect the result of the motion compensation, and gradually change the addition rates with changes in the flatness degree, and thereby it is possible to reduce block distortion and flickering and fluctuation phenomena in the time direction in the resulting output images.

In addition, it is preferable that the image processing apparatus further includes a first reliability degree calculation unit configured to calculate a first reliability degree indicating a matching degree between the input image and the first image; and a second reliability degree calculation unit configured to calculate a second reliability degree indicating a matching degree between the input image and the second image, wherein the rate calculation unit is configured to calculate the addition rates for the input image, the first image, and the second image, additionally using the calculated first reliability degree and second reliability degree.

With this, the addition rates for the input image, reference image before motion compensation, and reference image after motion compensation are calculated using the reliability degrees in addition to the flatness degree of the input image, and these images are added according to the addition rates. Here, it is possible to determine the magnitudes of the rates of the reference images to be added to the input image, based on the magnitudes of the reliability degrees. Since the reference image before motion compensation and the reference image after motion compensation are added to the input image according to the addition rates calculated based on the flatness degree and reliability degrees, no sudden change occurs in the images although such a sudden change is caused when the reference image to be added to the input image is switched between the reference image before motion compensation and the reference image after motion compensation. For this reason, the image processing apparatus according to the present invention can reduce block distortion around the boundaries between the blocks subjected to motion compensation in images when reducing noise in the images using temporal noise removal schemes, and thereby obtaining output images having an excellent image quality. Since no sudden change occurs in the temporally consecutive images, flickering and fluctuation phenomena can be reduced.

In addition, it is preferable that the rate calculation unit is configured to calculate the addition rates for the respective images such that the addition rate for the first image becomes higher as the first reliability degree becomes higher, and that the addition rate for the second image becomes higher as the second reliability degree becomes higher.

According to this, the addition rate for a reference image is set higher as the reference image has a higher reliability degree with the input image. In other words, a higher addition rate is set for a reference image that is more similar to the input image, and such a reference image is added. In this way, it is possible to appropriately reflect the result of the motion compensation, and gradually change the addition rates with changes in the flatness degrees, and thereby it is possible to reduce block distortion and flickering and fluctuation phenomena in the time direction in the output images.

The present invention can be implemented not only as such an image processing apparatus, but also as an integrated circuit which includes the respective processing units that constitute the image processing apparatus and controls the image processing apparatus, and a method including, as the steps, processes that are performed by the respective processing units. Furthermore, the present invention can be implemented as a program causing a computer to execute these steps, as a recording medium such as a computer-readable CD-ROM on which the program is recorded, and as information, data, and/or a signal that represent(s) the program. These program, information, data and signal may be distributed through communication networks such as the Internet.

ADVANTAGEOUS EFFECTS OF INVENTION

According to the present invention, it is possible to reduce block distortion in images when reducing noise in the images using a temporal noise removal scheme, and thereby generating output images having an excellent image quality. Since no sudden change occurs in the temporally consecutive images, flickering and fluctuation phenomena can be reduced.

DESCRIPTION OF EMBODIMENTS

Hereinafter, an embodiment in the present invention is described with reference to the drawings.

Figure 1:
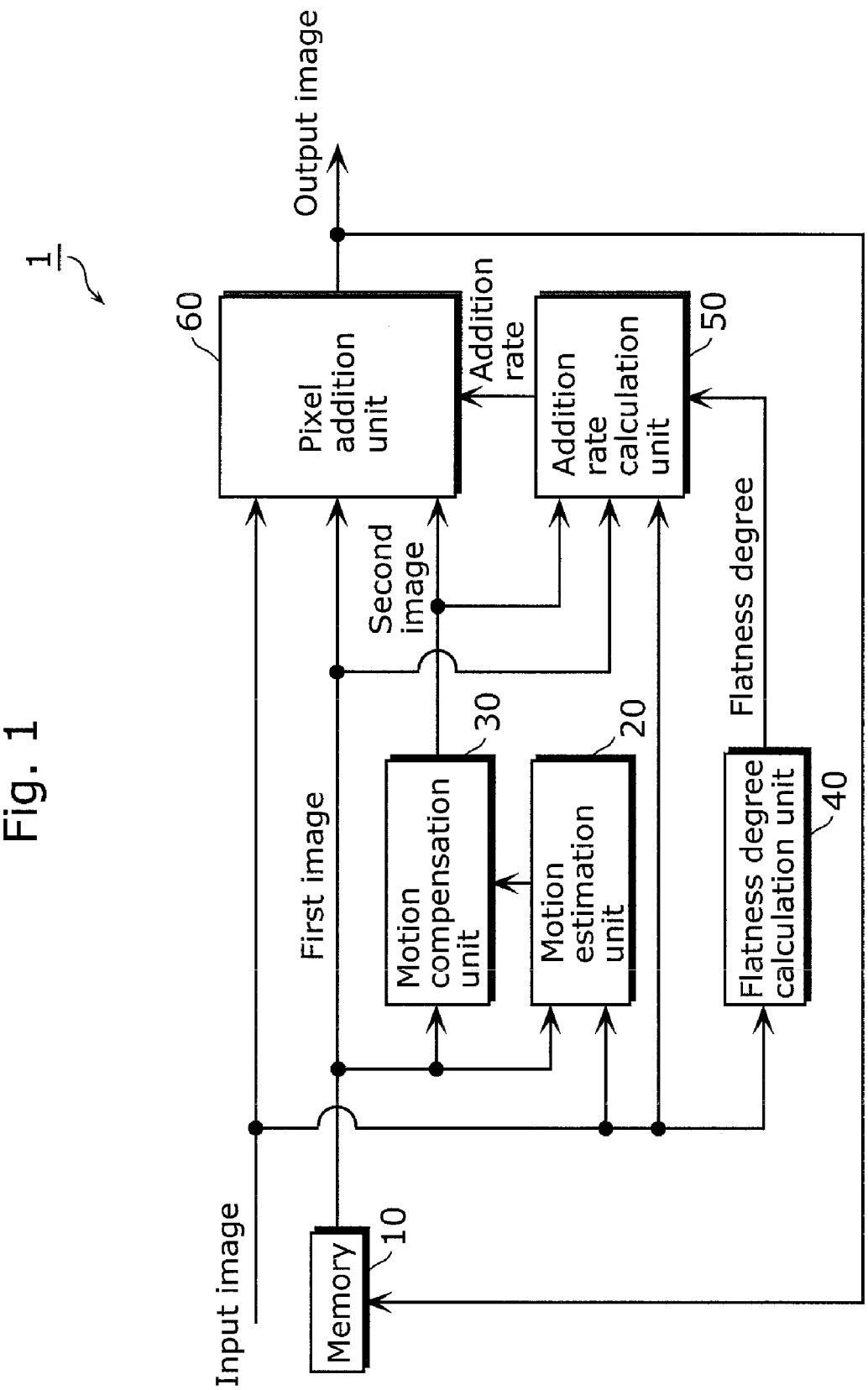
FIG. 1 is a functional block diagram showing a functional structure of an image processing apparatus according to an embodiment of the present invention.

FIG. 1 is a functional block diagram showing a functional structure of an image processing apparatus 1 according to the embodiment of the present invention.

The image processing apparatus 1 is intended to remove noise in an input image by adding a reference image to the input image. As shown in the diagram, the image processing apparatus 1 includes a memory 10, a motion estimation unit 20, a motion compensation unit 30, a flatness degree calculation unit 40, an addition rate calculation unit 50, and a pixel addition unit 60.

The memory 10 is a memory storing a reference image for use in motion compensation. More specifically, the memory 10 stores an output image from the pixel addition unit 60 as a reference image.

The motion estimation unit 20 generates motion information indicating an estimated motion in the input image. More specifically, the motion estimation unit 20 performs the motion estimation, using the input image and a first image that is the reference image stored in the memory 10. The reference image used here is the output image that immediately precedes the input image. The motion information used here is information indicating amounts of motions between the respectively corresponding pixels in temporally consecutive images.

The motion compensation unit 30 generates a second image corresponding to a first image by performing motion compensation using the motion information. Here, the second image is a reference image after motion compensation, and the first image is a reference image before motion compensation. More specifically, the motion compensation unit 30 generates the second image, by performing motion compensation on the first image using the motion information generated by the motion estimation unit 20.

The flatness degree calculation unit 40 calculates the flatness degree of the input image. More specifically, the flatness degree calculation unit 40 calculates the flatness degree of the input image such that the flatness degree becomes higher as the pixel value variation or the edge amount of the input image becomes smaller. Here, the flatness degree is a value indicating the degree of smallness in change in the input image.

The addition rate calculation unit 50 calculates addition rates for the input image, the first image, and the second image, using the flatness degree calculated by the flatness degree calculation unit 40. Details of the addition rate calculation unit 50 are described later on.

The pixel addition unit 60 generates an output image by adding the input image, the first image, and the second image, according to the addition rates calculated by the addition rate calculation unit 50.

Next, the addition rate calculation unit 50 is described in detail.

Figure 2:
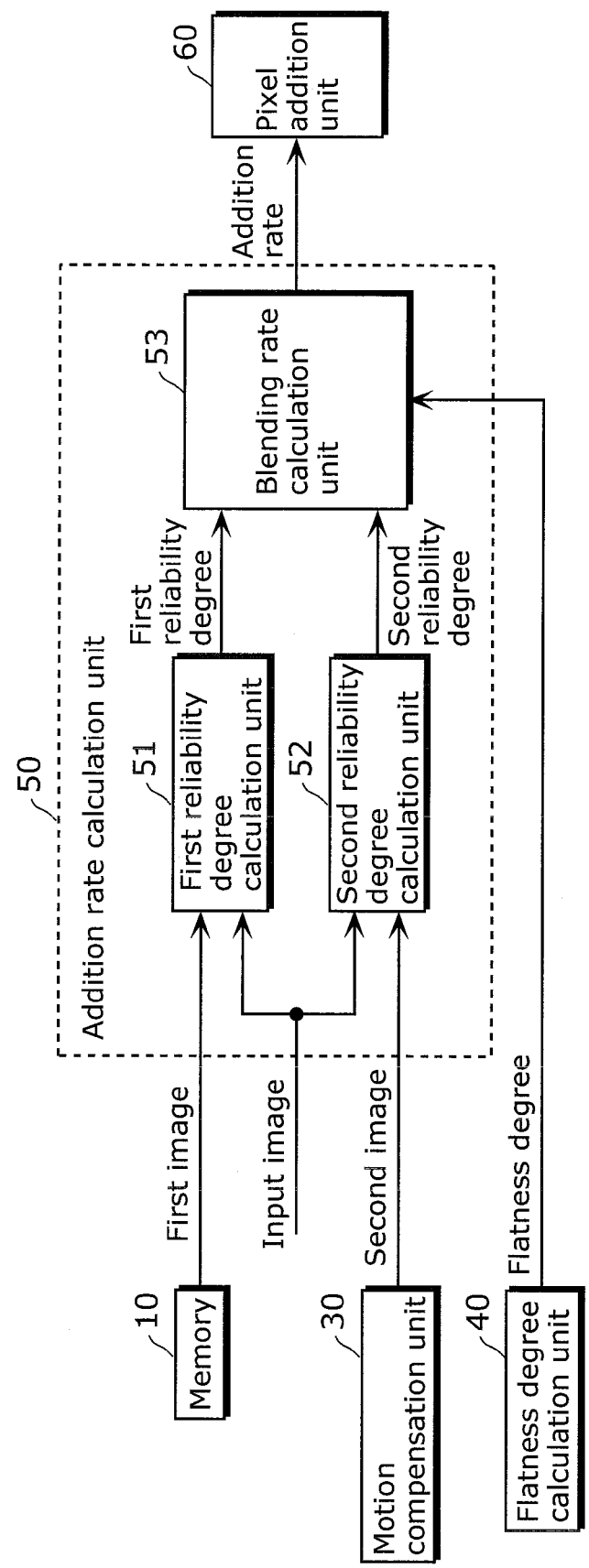
FIG. 2 is a functional block diagram showing a detailed structure of the addition rate calculation unit in the embodiment of the present invention.

FIG. 2 is a functional block diagram showing a detailed structure of the addition rate calculation unit 50 in this embodiment of the present invention.

As shown in the diagram, the addition rate calculation unit 50 includes a first reliability degree calculation unit 51, a second reliability degree calculation unit 52, and a blending rate calculation unit 53.

The first reliability degree calculation unit 51 calculates a first reliability degree indicating a matching degree between the input image and the first image stored in the memory 10.

The second reliability degree calculation unit 52 calculates a second reliability degree indicating a matching degree between the input image and the second image generated by the motion compensation unit 30.

The blending rate calculation unit 53 calculate addition rates for the input image, the first image, and the second image, using the flatness degree calculated by the flatness degree calculation unit 40, the first reliability degree calculated by the first reliability degree calculation unit 51, and the second reliability degree calculated by the second reliability degree calculation unit 52, respectively. The blending rate calculation unit 53 has a function of the "rate calculation unit" recited in the Claims.

More specifically, the blending rate calculation unit 53 calculates the addition rates for the respective images such that the addition rate for the first image becomes higher and the addition rate for the second image becomes lower as the flatness degree becomes higher, and that the addition rate for the first image becomes lower and the addition rate for the second image becomes higher as the flatness degree becomes lower.

The blending rate calculation unit 53 calculates the addition rates for the respective images such that the addition rate for the first image becomes higher as the first reliability degree becomes higher, and that the addition rate for the second image becomes higher as the second reliability degree becomes higher. The blending rate calculation unit 53 outputs the calculated addition rates to the pixel addition unit 60.

Next, operations performed by the image processing apparatus 1 are described.

Figure 3:
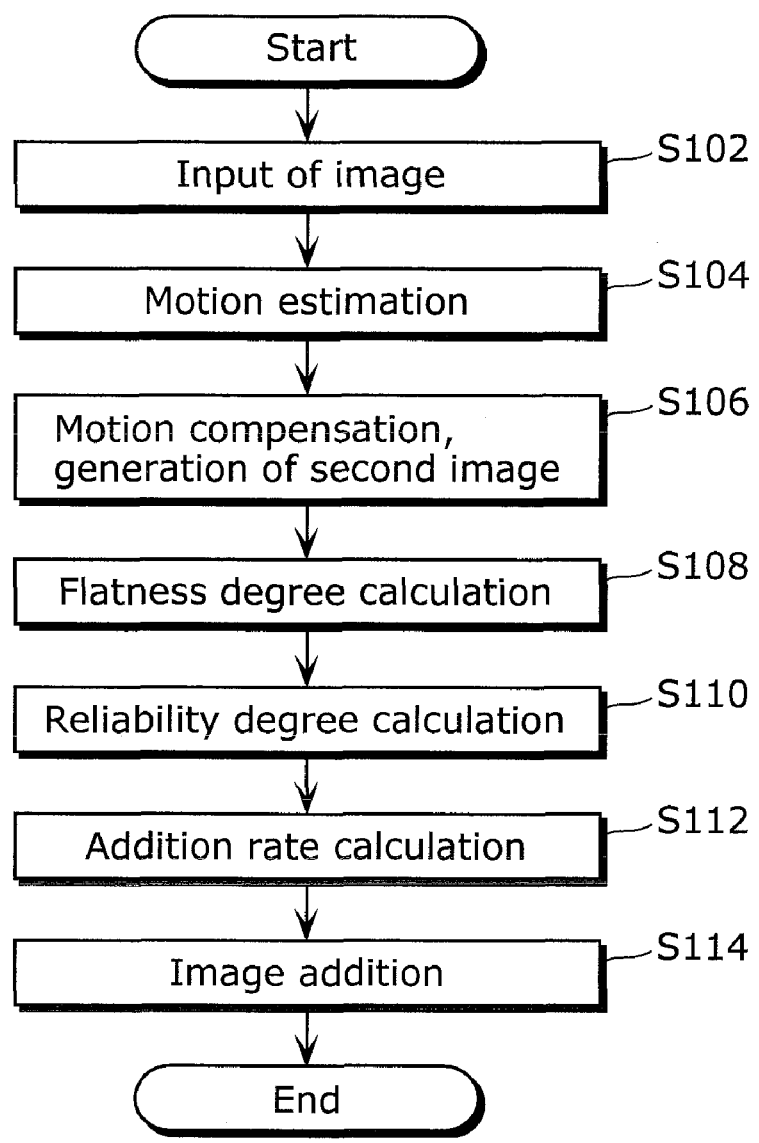
FIG. 3 is a flowchart indicating exemplary operations performed by the image processing apparatus in the embodiment of the present invention.

FIG. 3 is a flowchart indicating exemplary operations performed by the image processing apparatus 1 in this embodiment of the present invention. It is assumed that the memory 10 stores a reference image.

First, an input image is input (S102).

The motion estimation unit 20 performs motion estimation using the input image and a first image that is the reference image stored in the memory 10 (S104). More specifically, the motion estimation unit 20 estimates a motion for the input image, more specifically, generates, utilizing block matching, motion information indicating the motion.

Here, block matching is a scheme involving segmenting an input image into blocks having a predetermined size, and therewith detecting the positions of corresponding blocks in a reference image for the input image. More specifically, the motion estimation unit 20 shifts, for a block in the input image, each of the blocks having the same size within a predetermined search range in the reference image, and thereby calculating the positional difference between the block in the input image and each block within the search range.

The block in the reference image that yields the minimum positional difference corresponds to the block in the input image. In other words, this positional difference between the block in the input image and the corresponding block in the reference image is the result of the motion estimation. For this reason, the motion estimation unit 20 generates the positional difference as the motion information.

A general block matching scheme is used in this embodiment, but any other motion estimation schemes such as block matching according to the phase-only correlation may be used.

Next, the motion compensation unit 30 performs motion compensation using the reference image, based on the result of the motion estimation (S106). More specifically, the motion compensation unit 30 generates the second image corresponding to the first image by performing motion compensation using the motion information generated by the motion estimation unit 20.

Here, the reference image is associated with the input image on a block-by-block basis. In other words, the motion compensation unit 30 generates, as the second images, the reference image blocks associated one-to-one with the input image blocks.

However, in some cases, such results of motion estimation are not accurate. For example, in an image including much noise, noise is dominant over a signal. In this case, an input image block having a noise pattern may be associated with a reference image block having a similar noise pattern, which may result in estimation of motion different from actual motion.

When the shape of a subject in an image changes and a reference image does not include a block corresponding to a block in the input image, accurate motion estimation is impossible.

In the case where a subject in an image repeatedly stops and moves, discontinuity occurs around the boundary between a still region and a moving region in images after motion compensation, resulting in block noise. When this block noise portion is added, the resulting output image suffers from block distortion. In the case where such block distortion occurs in positions different from frame to frame in temporally consecutive images such as a video, the resulting video suffers from flickering and fluctuation.

In order to suppress such block distortion, flickering and fluctuation, the present invention adds the first image that is the reference image before motion compensation, the second image that is the reference image after motion compensation, and the input image, and thereby performing control such that the addition rates for the respective images that are the first image and second image are gradual.

In most cases, a current block and the neighboring blocks in a flat image region have similar features. This is the reason why motion estimation accuracy decreases. In the case of an image having much noise, it is impossible to perform accurate motion estimation due to the influence of the noise. In the opposite case of a block in a non-flat region including features such as edges in an image, the block has a feature as an image, and thus it is possible to perform accurate motion estimation.

For this reason, the addition rates for the first image and the second image are controlled by utilizing the relationships between the flatness degree of the image and the motion estimation accuracy for the respective images as described above.

The flatness degree calculation unit 40 calculates a flatness degree for each of the regions in the input image (S108). In this embodiment, the flatness degree calculation unit 40 calculates the flatness degree, based on the magnitude of variation in pixel values of the input image and the edge amount in the input image.

Here, a description is given of how the flatness degree calculation unit 40 calculates the flatness degree based on the variation in the pixel values of the input image.

First, the flatness degree calculation unit 40 calculates the average value of the pixel values of the pixels in a current region. Next, the flatness degree calculation unit 40 calculates an absolute value of the difference between the average value and each of the pixel values of the pixels within the current region, and calculates the mean absolute deviation.

More specifically, when the average value of the pixel values of the pixels within the current region is f_mean, and the mean absolute deviation is f_diff, f_mean and f_diff are calculated as indicated below. Here, the number of pixels in the current region is N, and the pixel value of each pixel is represented as f(i) (i=1 to N).

$$f\_mean = \frac{1}{N}\sum_{i=1}^{N} f(i)$$ [Math. 1]

$$f\_diff = \frac{1}{N}\sum_{i=1}^{N} |f(i) - f\_mean|$$ [Math. 2]

Next, the flatness degree calculation unit 40 calculates the flatness degree using f_diff.

Figure 4:
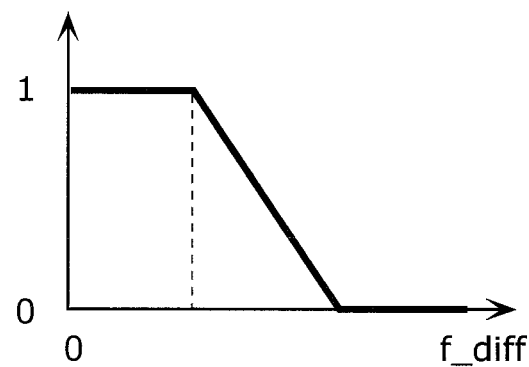
FIG. 4 is a diagram showing an exemplary flatness degree calculation scheme performed by the flatness degree calculation unit in the embodiment of the present invention.

FIG. 4 is a diagram showing an exemplary scheme of calculating the flatness degree from f_diff, performed by the flatness degree calculation unit 40 in this embodiment of the present invention.

As shown in the diagram, when f_diff of the current region is small, the pixels have a small variation in the pixel values with respect to the average. Thus, the flatness degree calculation unit 40 sets a high flatness degree. In contrast, when f_diff of the current region is large, the pixels has a large variation in the pixel values with respect to the average. Thus, the flatness degree calculation unit 40 sets a low flatness degree. In this way, the flatness degree calculation unit 40 calculates the flatness degree of the input image such that the flatness degree becomes higher as the variation in pixel values of the pixels in the input image becomes smaller.

The function shown in the diagram does not always need to be used when the flatness degree calculation unit 40 performs such transformation for calculating the flatness degree. Any other functions may be used in this embodiment on condition that the flatness degree becomes higher as f_diff becomes smaller and the flatness degree becomes lower as f_diff becomes larger.

The flatness degree calculation unit 40 calculates f_diff using the mean absolute deviation with respect to the average value of the pixel values in the current region. However, the function shown in the above expression is not always used. Another amount indicating a variation from an average such as a standard deviation value may be used.

Next, a description is given of how the flatness degree calculation unit 40 performs processes of calculating a flatness degree from an edge amount in the input image.

As indicated in the above descriptions, the flatness degree calculation unit 40 calculates the flatness degrees in an image. Here, a high flatness degree shows that the edge amount in the image is small, and in contrast, a low flatness degree shows that the edge amount in the image is large. For this reason, the flatness degree calculation unit 40 may calculate flatness degrees based on edge amounts. The following indicates an example of how to utilize such edge amounts when calculating the flatness degrees.

First, the flatness degree calculation unit 40 extracts edges in a current region. The flatness degree calculation unit 40 extracts the edges using a general edge extraction filter such as a Prewitt filter, a Sobel filter, and a Laplacian filter. Here, the pixel values of the pixels in the current region is f(i) (i=1 to N), and the filtering results obtained when the flatness degree calculation unit 40 filters the respective pixels are f_filter (i) (i=1 to N).

Next, the flatness degree calculation unit 40 calculates the average edge in the current region by averaging f_filter(i) in the current region. When the average edge is f_edge, the flatness degree calculation unit 40 calculates f_edge as indicated below.

$$f\_edge = \frac{1}{N}\sum_{i=1}^{N} f\_filter(i)$$ [Math. 3]

Next, the flatness degree calculation unit 40 calculates the edge amount in the current region using f_edge.

Figure 5:
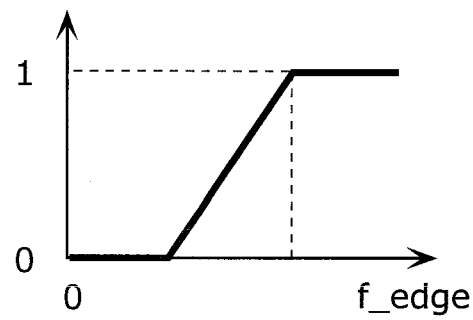
FIG. 5 is a diagram showing an exemplary scheme of calculating an edge amount from f_edge, performed by the flatness degree calculation unit in the embodiment of the present invention.

FIG. 5 is a diagram showing an exemplary scheme of calculating the edge amount from f_edge, performed by the flatness degree calculation unit 40 in this embodiment of the present invention.

As shown in the diagram, when f_edge in the current region is small, the flatness degree calculation unit 40 sets a small edge amount. In contrast, when f_edge in the current region is large, the flatness degree calculation unit 40 sets a large edge amount.

The function shown in the diagram does not always need to be used when the flatness degree calculation unit 40 performs such transformation for calculating the flatness degree. Any other functions may be used in this embodiment on condition that the edge amount becomes smaller as f_edge becomes smaller and the edge amount becomes larger as f_edge becomes larger.

The flatness degree calculation unit 40 calculates the flatness degree from the edge amount.

Figure 6:
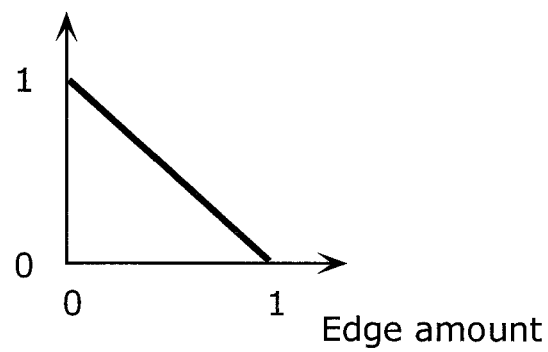
FIG. 6 is a diagram showing an exemplary scheme of calculating a flatness degree from an edge amount, performed by the flatness degree calculation unit in the embodiment of the present invention.

FIG. 6 is a diagram showing an exemplary scheme of calculating the flatness degree from the edge amount, performed by the flatness degree calculation unit 40 in this embodiment of the present invention.

As shown in the diagram, when the edge amount in the current region is small, the flatness degree calculation unit 40 sets a high flatness degree. In contrast, when the edge amount is large, the flatness degree calculation unit 40 sets a low flatness degree. In this way, the flatness degree calculation unit 40 calculates the flatness degree of the input image such that the flatness degree becomes higher as the edge amount in the input image becomes smaller.

The function shown in the diagram does not always need to be used when the flatness degree calculation unit 40 performs such transformation for calculating the flatness degree. Any other functions may be used in this embodiment on condition that the flatness degree becomes higher as the edge amount becomes smaller and the flatness degree becomes lower as the edge amount becomes larger.

Here, the flatness degree is a numerical value of between 0 and 1 inclusive. The flatness degree may be a value within a range different from a range between 0 and 1 inclusive.

Returning to FIG. 3, the addition rate calculation unit 50 calculates addition rates for the input image, the first image, and the second image, using the flatness degree calculated by the flatness degree calculation unit 40 (S110, S112).

More specifically, the addition rate calculation unit 50 calculates the reliability degrees of the first image and the second image. Next, the addition rate calculation unit 50 calculates a blending rate using the flatness degree, and finally outputs the addition rates of the first image, the second image, and the input image.

More specifically, the first reliability degree calculation unit 51 calculates a first reliability degree that is a reliability degree between the input image and the first image, whereas the second reliability degree calculation unit 52 calculates a second reliability degree that is a reliability degree between the input image and the second image (S110). Here, a reliability degree indicates, for each image region, a matching degree between the input image and either the first image or the second image.

The first reliability degree and the second reliability degree are calculated in the same manner. Accordingly, how the first reliability degree calculation unit 51 calculates a first reliability degree is described below, but how the second reliability degree calculation unit 52 calculates a second reliability degree is not described.

The first reliability degree calculation unit 51 calculates the first reliability degree, based on a MAD (Mean Absolute Deviation). A MAD indicates an amount of difference. The MAD between the input image and the first image is defined according to the expression indicated below.

$$MAD = \frac{1}{N}\sum_{i=1}^{N} |f1(i) - f2(i)| \qquad \text{[Math. 4]}$$

Here, $f1(i)$ (i=1 to N) and $f2(i)$ (i=1 to N) denote the pixel values in the input image and the pixel values in the first image, respectively, and N denotes the number of pixels.

The first reliability degree calculation unit 51 calculates the first reliability degree using the MAD.

Figure 7:
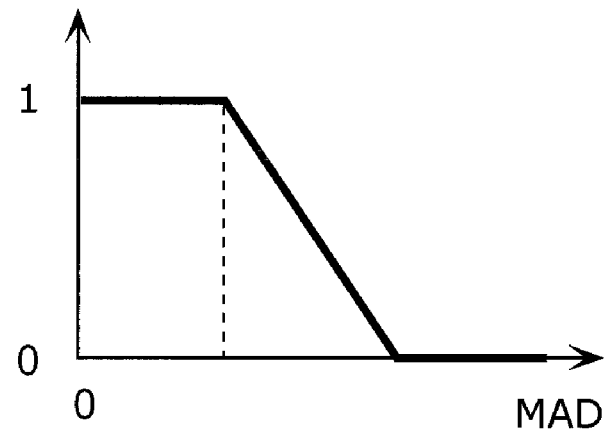
FIG. 7 is a diagram showing an exemplary scheme of calculating a first reliability degree from a MAD, performed by a first reliability degree calculation unit in the embodiment of the present invention.

FIG. 7 is a diagram showing an exemplary scheme of calculating the first reliability degree from the MAD, performed by the first reliability degree calculation unit 51 in this embodiment of the present invention.

A small MAD indicates that the difference between a block in the input image and a block in the first image is small, and thus that the matching degree between the block in the input image and the block in the first image is high. This is utilized as shown in the diagram. When the MAD is small, the first reliability degree calculation unit 51 calculates a high reliability degree. When the MAD is large, the matching degree between the block in the input image and the block in the first image is low, and thus the first reliability degree calculation unit 51 calculates a low reliability degree.

The MAD is used to calculate a reliability degree in this embodiment, but the MAD is not always used. A SAD (Sum of Absolute Difference), an SSD (Sum of Squared Difference), or the like that indicates the difference between two images may be used.

The function shown in the diagram does not always need to be used to calculate a reliability degree. Another function may be used which satisfies a condition that the reliability degree becomes higher as the difference between images becomes smaller, and the reliability degree becomes lower as the difference between images becomes larger.

Here, each of the first reliability degree and the second reliability degree is a numerical value between 0 and 1 inclusive. However, each of the first reliability degree and the second reliability degree may be a value within a range different from a range between 0 and 1 inclusive.

Returning to FIG. 3, the blending rate calculation unit 53 calculates addition rates for the first image, the second image, and the input image using the calculated first reliability degree, second reliability degree, and flatness degree (S112).

A current block and the neighboring blocks in a flat image region have similar characteristics. This is the reason why accuracy in motion estimation therein decreases. In the case of an image including much noise, it is impossible to perform accurate motion estimation due to the influence of the noise. In the opposite case of a current block in a non-flat region including features such as edges in an image, the block has a feature as an image, and thus it is possible to perform accurate motion estimation.

Utilizing this feature, the blending rate calculation unit 53 preferentially adds the first image so as to reduce the influence of motion estimation in the flat region. In contrast, in the case of a non-flat region, the blending rate calculation unit 53 preferentially adds the second image because accurate motion estimation can be performed therein.

More specifically, the blending rate calculation unit 53 calculates the addition rates for the respective images such that the addition rate for the first image becomes higher and the addition rate for the second image becomes lower as the flatness degree becomes higher, and that the addition rate for the first image becomes lower and the addition rate for the second image becomes higher as the flatness degree is lower.

Since the matching degree between images becomes higher as the reliability degree between the images becomes higher, the blending rate calculation unit 53 preferentially adds the image having the higher reliability degree. The blending rate calculation unit 53 calculates the addition rates for the respective images such that the addition rate for the first image becomes higher as the first reliability degree becomes higher, and that the addition rate for the second image becomes higher as the second reliability degree becomes higher.

The blending rate calculation unit 53 adds pixel values in units of a pixel when adding images. For this reason, the calculated block-based flatness degrees, first reliability degrees, and second reliability degrees must be converted into pixel-based flatness degrees, first reliability degrees, and second reliability degrees. In this embodiment, the blending rate calculation unit 53 performs interpolation from block to pixels using information about the current block and information about the neighbouring blocks. For example, an interpolation scheme shown in FIG. 8 is used.

Figure 8:
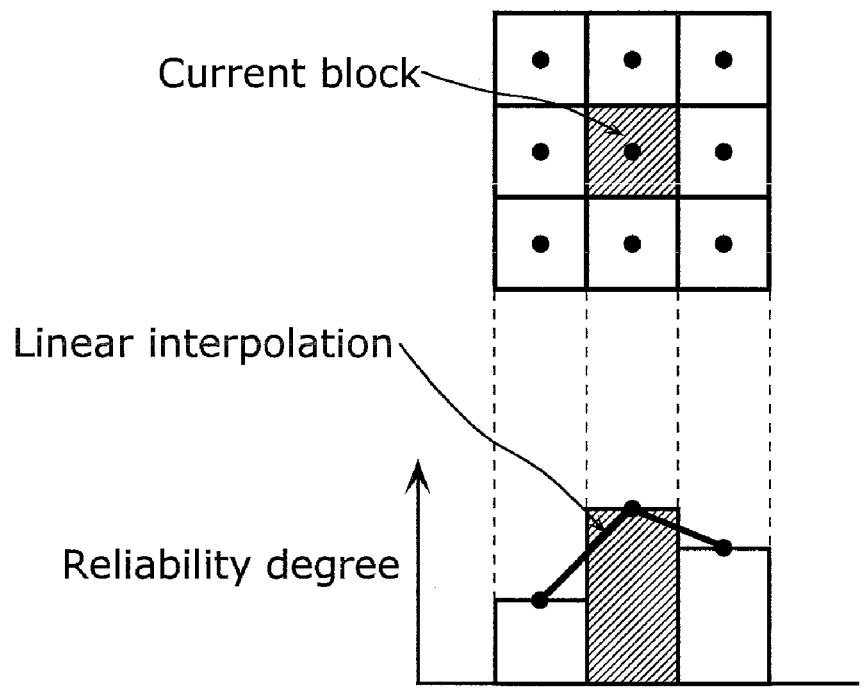
FIG. 8 is a diagram showing an exemplary linear interpolation scheme performed by a blending rate calculation unit in the embodiment of the present invention.

FIG. 8 is a diagram showing an exemplary linear interpolation scheme performed by the blending rate calculation unit 53 in this embodiment of the present invention. The scheme described here as an example is a scheme of calculating pixel-based reliability degrees, based on block-based reliability degrees.

As shown in the diagram, the blending rate calculation unit 53 performs interpolation using the block-based reliability degrees of the current block and neighbouring 8 blocks to calculate the pixel-based reliability degrees of the current block. More specifically, the blending rate calculation unit 53 calculates the reliability degrees of the respective pixels in the current block by performing linear interpolation assuming that a block-based reliability degree is the reliability degree at the center position of the block.

In this embodiment, linear interpolation is used when the blending rate calculation unit 53 converts the block-based reliability degree and flatness degree into the pixel-based reliability degrees and flatness degrees. However, linear interpolation does not always need to be used.

When a pixel-based flatness degree calculated by the blending rate calculation unit 53 is Flat, and a pixel-based first reliability degree is conf_ref, and a pixel-based second reliability degree is Conf_mc, the blending rate calculation unit 53 calculates the respective addition rates according to the following expressions.

$$R\_ref = Flat \times Conf\_ref \quad \text{[Math. 5]}$$

$$R\_mc = (1 - Flat) \times Conf\_mc \quad \text{[Math. 6]}$$

The blending rate calculation unit 53 calculates the addition rate R_ref for the first image by multiplying the flatness degree by the first reliability degree, and calculates the addition rate R_mc for the second image by multiplying, by the second reliability degree, a value obtained by subtracting the flatness degree from 1.

The blending rate calculation unit 53 calculates the addition rate R_curr for the input image by subtracting, from 1, both the addition rate for the first image and the addition rate for the second image as indicated below such that the average luminance of the image after the processing does not change.

$$R\_curr = 1 - (R\_ref + R\_mc) \quad \text{[Math. 7]}$$

In this way, the blending rate calculation unit 53 calculates the addition rates using the flatness degree and the reliability degrees.

Figure 9A:
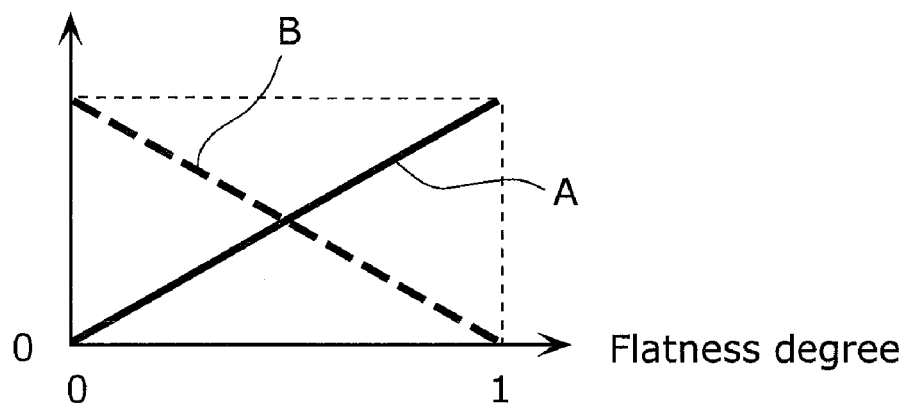
FIG. 9A is a diagram showing the relationship between the flatness degree and the addition rates calculated by the blending rate calculation unit in the embodiment of the present invention.

FIG. 9A is a diagram showing the relationship between the flatness degree and the addition rates calculated by the blending rate calculation unit 53 in this embodiment of the present invention. In the diagram, the solid line A represents the addition rates for the first image and the dotted line B represents the addition rates for the second image when the reliability degree is fixed at a certain value.

As shown in the diagram, when the reliability degree is fixed at the certain value, the addition rate for the first image (represented by the solid line A) becomes higher as the flatness degree becomes higher. Likewise, the addition rate of the second image (represented by the dotted line B) becomes lower as the flatness degree becomes lower. In this way, the blending rate calculation unit 53 is capable of controlling the respective addition rates such that the addition rates gradually changes according to the flatness degrees.

Figure 9B:
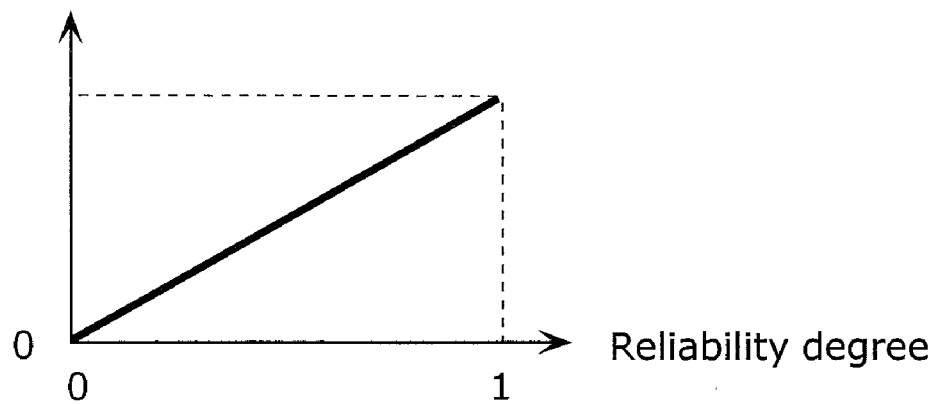
FIG. 9B is a diagram showing the relationship between the reliability degree and the addition rates calculated by the blending rate calculation unit in the embodiment of the present invention.

FIG. 9B is a diagram showing the relationship between the reliability degree and the addition rates calculated by the blending rate calculation unit 53 in this embodiment of the present invention. The diagram shows the addition rates for the first image and the addition rates for the second image when the flatness degree is fixed at a certain value.

As shown in the diagram, when the flatness degree is fixed at the certain value, the addition rate for the first image becomes higher as the first reliability degree becomes higher, and the addition rate for the second image becomes higher as the second reliability degree becomes higher. In this way, the blending rate calculation unit 53 is capable of controlling the respective addition rates such that the addition rates gradually change according to the flatness degrees.

When both the first reliability degree Conf_ref and the second reliability degree Conf_mc are 1, the addition rate R_curr for the input image is 0. Thus, an upper limit value may be set for either the first reliability degree Conf_ref or the second reliability degree Conf_mc. This upper limit value is preferably around 0.8, but any numerical value smaller than 1 is possible.

Returning to FIG. 3, lastly, the pixel addition unit 60 adds the first image, the second image, and the input image using the pixel-based addition rates calculated by the blending rate calculation unit 53 so as to generate an output image (S114).

More specifically, when the pixel value of the input image is I(i), the pixel value of the first image is Ref(i), and the pixel value of the second image is MC(i), the pixel addition unit 60 calculates the pixel value O(i) of the output image according to the following expression.

$$O(i) = R\_curr(i) \times I(i) + R\_ref(i) \times Ref(i) + R\_mc(i) \times MC(i) \quad \text{[Math. 8]}$$

More specifically, the pixel addition unit 60 generates the output image by adding (i) the value obtained by multiplying the pixel value of the input image by the addition rate for the input image, (ii) the value obtained by multiplying the pixel value of the first image by the addition rate for the first image, and (iii) the value obtained by multiplying the pixel value of the second image by the addition rate for the second image.

In this way, the image processing apparatus 1 completes the operation of removing noise in the input image.

With this structure, it is possible to control the addition rates for the first image, the second image, and the input image such that the addition rates gradually change according to the flatness degrees of input images. This makes it possible to prevent degradation in the image quality of the resulting output image, more specifically, to achieve output images which have been subjected to effective noise removal and therefore have an excellent image quality. This prevent a sudden change between temporally consecutive images, and thus flickering and fluctuation phenomena do not occur.

In other words, the addition rates for the input image, the reference image before motion compensation, and the reference image after motion compensation are calculated using the flatness degrees of the input images, and these images are added according to the addition rates. Here, there is a tendency that motion estimation can be accurately performed when a flatness degree is low. Therefore, it is possible to calculate the addition rates using the magnitude of the flatness degree as an indicator as to whether motion estimation can be accurately performed. Since the reference image before motion compensation and the reference image after motion compensation are added to the input image according to the addition rates calculated based on the flatness degrees, no sudden change occurs in the images although such a sudden change is caused when the reference image to be added to the input image is switched between the reference image before motion compensation and the reference image after motion compensation.

Since motion estimation can be performed more accurately in a region that is less flat, the degree of motion compensation is set higher when the flatness degree is lower. In this way, it is possible to appropriately reflect the result of the motion compensation, and gradually change the addition rates with changes in the flatness degrees. A flatness degree is calculated based on either a pixel value variation or an edge amount. Therefore, the flatness degree can be simply calculated.

In other words, the addition rates for the input image, reference image before motion compensation, and reference image after motion compensation are calculated using the reliability degrees in addition to the flatness degree of the input image, and these images are added according to the addition rates. Here, it is possible to determine the magnitudes of the rates of the reference image to be added to the input image, based on the magnitudes of the reliability degrees. Since the reference image before motion compensation and the reference image after motion compensation are added to the input image according to the addition rates calculated based on the flatness degree and reliability degrees, no sudden change occurs in the images although such a sudden change is caused when the reference image to be added to the input image is switched between the reference image before motion compensation and the reference image after motion compensation.

The addition rate is set higher for a reference image having a higher reliability degree with the input image. In other words, a higher addition rate is set for a reference image that is more similar to the input image, and such a reference image is added. In this way, it is possible to appropriately reflect the result of the motion compensation, and gradually change the addition rate with changes in the reliability degrees.

As described above, the image processing apparatus 1 according to the present invention can reduce block distortion at the boundaries between the blocks subjected to motion compensation in images when reducing noise in the images using temporal noise removal schemes, and thereby generating output images having an excellent image quality. Since no sudden change occurs in the temporally consecutive images, flickering and fluctuation phenomena can be reduced.

Here, the processing units of the image processing apparatus 1 according to the present invention are typically implemented in the form of an LSI that is an integrated circuit.

Figure 10:
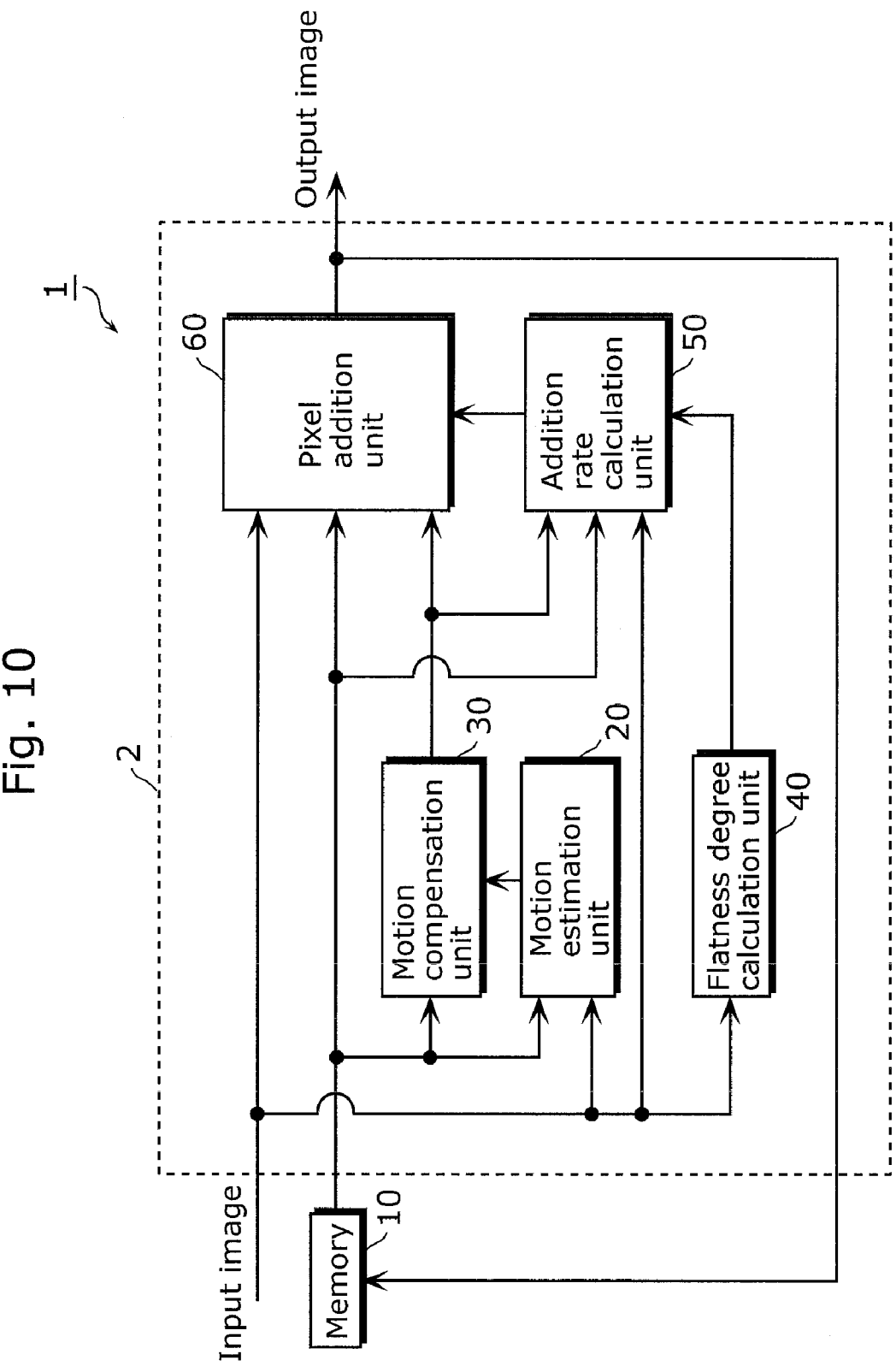
FIG. 10 is a diagram showing an image processing integrated circuit which controls the image processing apparatus according to the embodiment of the present invention.
Figure 11:
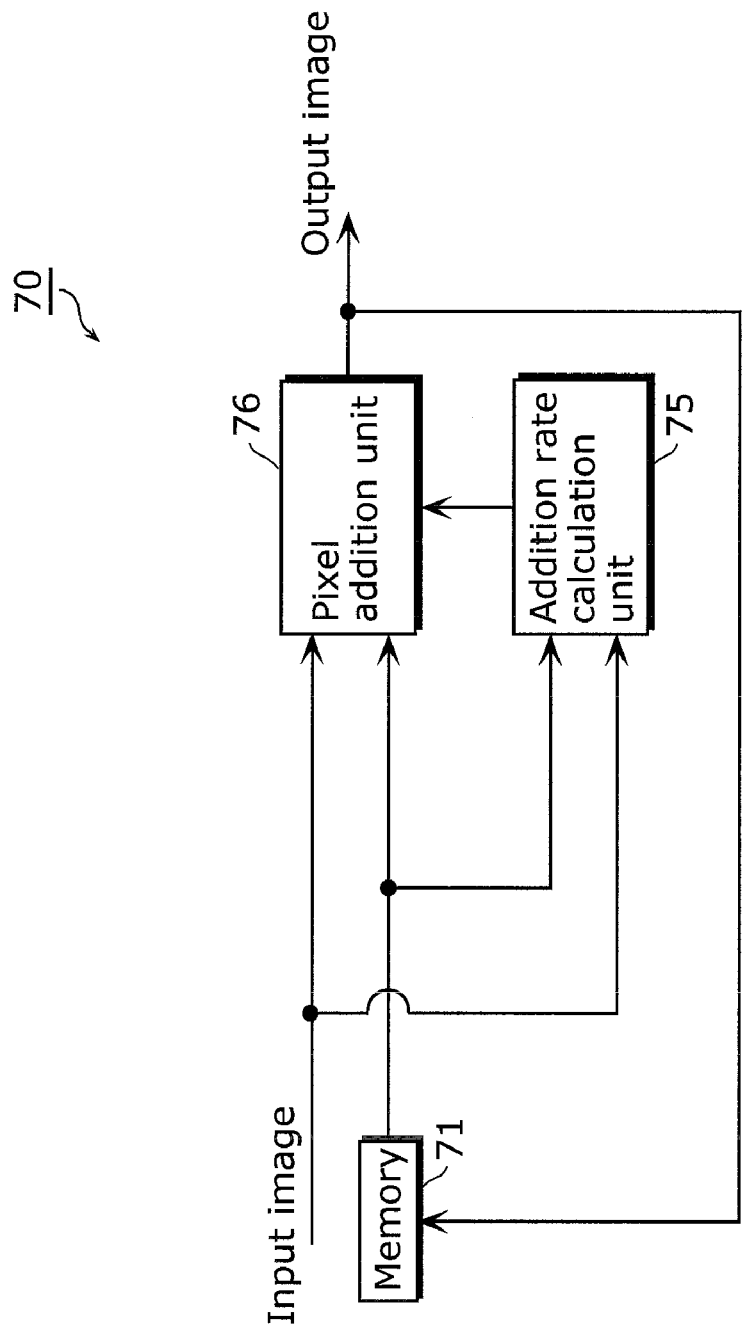
FIG. 11 is a functional block diagram showing a functional structure of a conventional image processing apparatus which performs a temporal noise removal scheme without using motion compensation.
Figure 12:
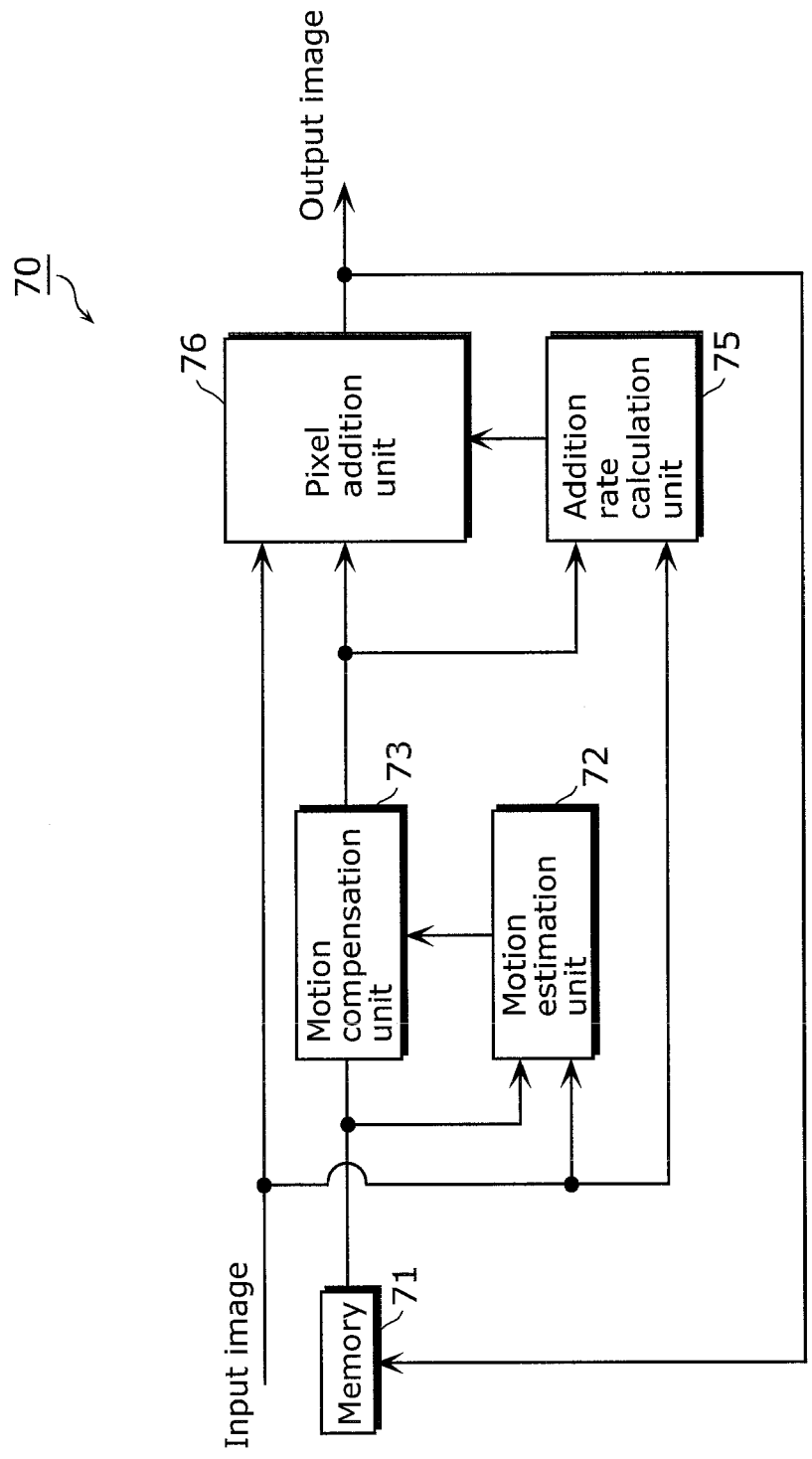
FIG. 12 is a functional block diagram showing a functional structure of a conventional image processing apparatus which performs a temporal noise removal scheme using motion compensation.
Figure 13:
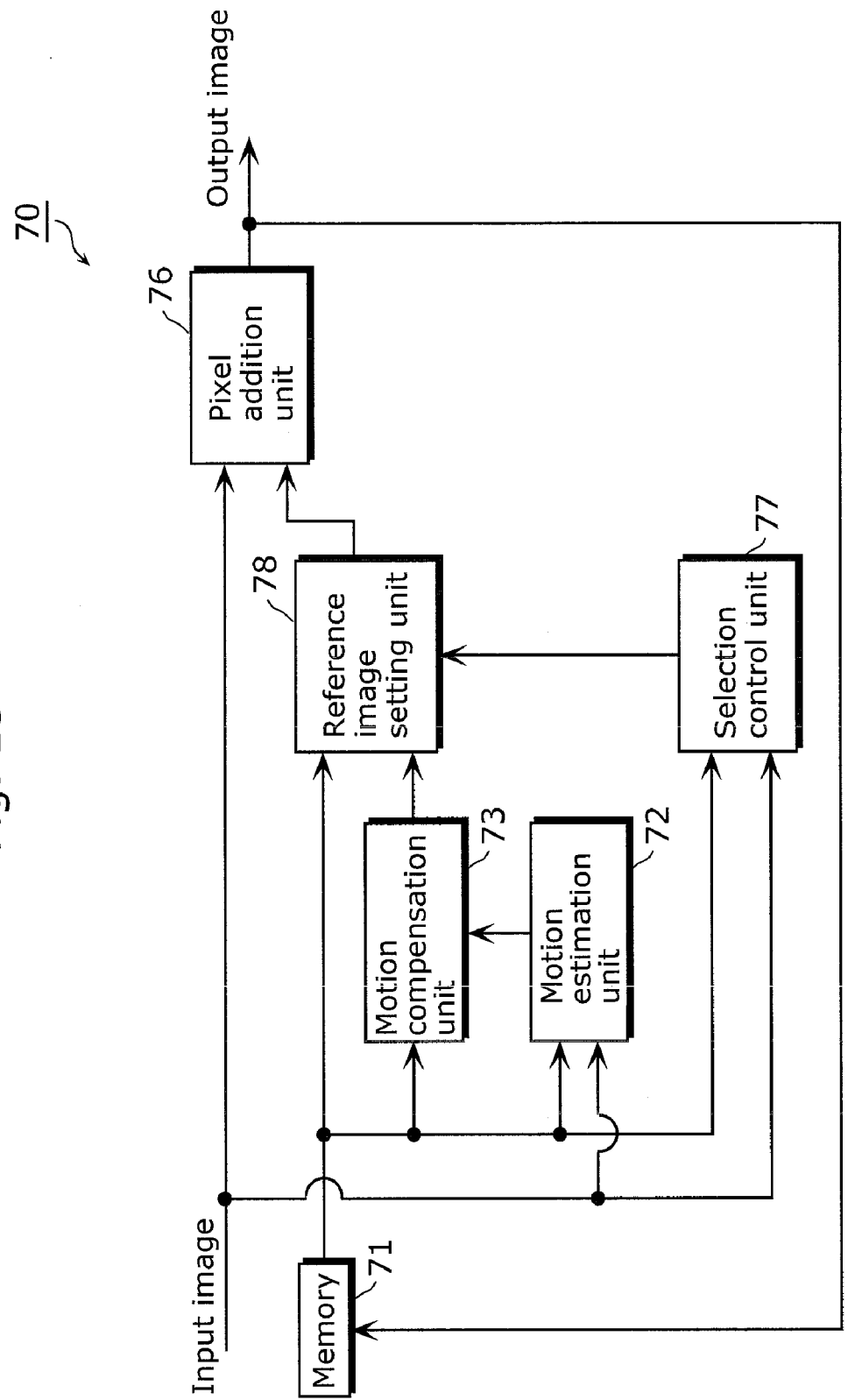
FIG. 13 is a functional block diagram showing a functional structure of a conventional image processing apparatus which performs a temporal noise removal scheme that is a combination of a scheme without using motion compensation and a scheme using motion compensation.

FIG. 10 is a diagram showing an image processing integrated circuit 2 which controls the image processing apparatus 1 according to the embodiment of the present invention.

As shown in the diagram, the processing units other than the memory 10 in the image processing apparatus 1 shown in FIG. 1 are integrated into the image processing integrated circuit 2. Each of the processing units included in the image processing integrated circuit 2 may be configured with a single chip, or a part or all of the processing units may be integrated into a single chip.

Although an LSI is described here, other names such as IC, system LSI, super LSI, or ultra LSI may be used depending on the degree of integration.

Moreover, ways to achieve circuit integration is not limited to the LSI, and a special circuit or a general-purpose processor is also available. In addition, it is also possible to use an FPGA (Field Programmable Gate Array) that is programmable after the LSI is manufactured or a reconfigurable processor that allows re-configuration of the connection or configuration of LSI can be used for the same purpose.

Furthermore, if an integrated circuit technology that replaces LSI appears with advancement in semiconductor technology or other derived technology, such new technology can naturally be used to carry out integration of such functional blocks. Application of biotechnology is one such possibility.

The image processing apparatus according to the present invention has been described above using the embodiment, but the present invention is not limited thereto.

The embodiment disclosed above is a mere example in all respects, and thus should not be construed to limit the present invention. The scope of the present invention is defined by the CLAIMS not by the DESCRIPTION, and all possible modifications having equivalents to those in the CLAIMS and within the scope of the CLAIMS are intended to be included in the present invention.

For example, in the embodiment, the addition rate calculation unit 50 includes the first reliability degree calculation unit 51 and the second reliability degree calculation unit 52, and the blending rate calculation unit 53 calculates addition rates based on reliability degrees and flatness degrees. However, it is possible to configure the addition rate calculation unit 50 without the first reliability degree calculation unit 51 and the second reliability degree calculation unit 52, and it is also possible for the blending rate calculation unit 53 to calculate addition rates based on flatness degrees. The blending rate calculation unit 53 can calculate the addition rates for the respective images using the addition rate for the input image determined in advance even when the flatness degree of the input image is not sufficient to calculate the addition rate for the input image.

Although the processing units of the image processing apparatus 1 are integrated into the integrated circuit in this embodiment, the processing units may be implemented in the form of software.

INDUSTRIAL APPLICABILITY

An image processing apparatus and method according to the present invention are intended to achieve highly-efficient noise removal by adding an input image, a reference image before motion compensation, and a reference image after motion compensation when removing noise by adding the pixels in the time direction. Furthermore, the image processing apparatus and method make it possible to suppress block distortion in resulting output images without making any sudden change in components of the images to be added, by controlling the addition rates for the reference images before motion compensation and the reference images after motion compensation, using the flatness degrees of the input images. In this way, as application to a video or consecutive images, the present invention can be applied to image processing apparatuses capable of removing noise from the video or consecutive images utilizing the feature of not causing flickering and fluctuation phenomena in the time direction.

REFERENCE SIGNS LIST 1, 70 Image processing apparatus
2 Image processing integrated circuit
10, 71 Memory
20, 72 Motion estimation unit
30, 73 Motion compensation unit
40 Flatness degree calculation unit 50 Addition rate calculation unit
51 First reliability degree calculation unit
52 Second reliability degree calculation unit
53 Blending rate calculation unit
60 Pixel addition unit
75 Addition rate calculation unit
76 Pixel addition unit
77 Selection control unit
78 Reference image setting unit

The invention claimed is:

1. An image processing apparatus which removes noise in an input image by adding a reference image to the input image, said image processing apparatus comprising:
   a motion estimation unit configured to generate motion information indicating a motion estimated for the input image;
   a motion compensation unit configured to generate a second image corresponding to a first image by performing motion compensation using the generated motion information, the second image being a reference image after motion compensation, and the first image being a reference image before motion compensation;
   a flatness degree calculation unit configured to calculate a flatness degree of the input image;
   a rate calculation unit configured to calculate addition rates for the input image, the first image, and the second image, using the calculated flatness degree; and
   a pixel addition unit configured to generate an image that is to be an output image by adding the input image, the first image, and the second image according to the addition rates calculated for the respective images that are the input image, the first image, and the second image.

2. The image processing apparatus according to claim 1, wherein said flatness degree calculation unit is configured to calculate the flatness degree of the input image such that the flatness degree becomes higher as a pixel value variation or an edge amount of the input image becomes smaller.

3. The image processing apparatus according to claim 1, wherein said rate calculation unit is configured to calculate the addition rates for the respective images such that the addition rate for the first image becomes higher and the addition rate for the second image becomes lower as the flatness degree becomes higher, and that the addition rate for the first image becomes lower and the addition rate for the second image becomes higher as the flatness degree becomes lower.

4. The image processing apparatus according to claim 1, further comprising:
   a first reliability degree calculation unit configured to calculate a first reliability degree indicating a matching degree between the input image and the first image; and
   a second reliability degree calculation unit configured to calculate a second reliability degree indicating a matching degree between the input image and the second image,
   wherein said rate calculation unit is configured to calculate the addition rates for the input image, the first image, and the second image, additionally using the calculated first reliability degree and second reliability degree.

5. The image processing apparatus according to claim 4, wherein said rate calculation unit is configured to calculate the addition rates for the respective images such that the addition rate for the first image becomes higher as the first reliability degree becomes higher, and that the addition rate for the second image becomes higher as the second reliability degree becomes higher.

6. The image processing apparatus according to claim 4, wherein said flatness degree calculation unit is configured to calculate the flatness degree that is a numerical value between 0 and 1 inclusive,
   said first reliability degree calculation unit is configured to calculate the first reliability degree that is a numerical value between 0 and 1 inclusive,
   said second reliability degree calculation unit is configured to calculate the second reliability degree that is a numerical value between 0 and 1 inclusive,
   said rate calculation unit is configured to calculate (i) the addition rate for the first image by multiplying the flatness degree by the first reliability degree, (ii) the addition rate for the second image by multiplying, by the second reliability degree, a value obtained by subtracting the flatness degree from 1, and (iii) the addition rate for the input image by subtracting, from 1, both the addition rate for the first image and the addition rate for the second image, and
   said pixel addition unit is configured to generate the output image by adding (i) a value obtained by multiplying a pixel value of the input image by the addition rate for the input image, (ii) a value obtained by multiplying a pixel value of the first image by the addition rate for the first image, and (iii) a value obtained by multiplying a pixel value of the second image by the addition rate for the second image.

7. An image processing method of removing noise in an input image by adding a reference image to the input image, said image processing method comprising:
   generating motion information indicating a motion estimated for the input image;
   generating a second image corresponding to a first image by performing motion compensation using the generated motion information, the second image being a reference image after motion compensation, and the first image being a reference image before motion compensation;
   calculating a flatness degree of the input image;
   calculating addition rates for the input image, the first image, and the second image, using the calculated flatness degree; and
   generating an image that is to be an output image by adding the input image, the first image, and the second image according to the addition rates calculated for the respective images that are the input image, the first image, and the second image.

8. A program recorded on a non-transitory computer-readable recording medium and being for executing image processing of removing noise in an input image by adding a reference image to the input image, said program causing a computer to execute:
   generating motion information indicating a motion estimated for the input image;
   generating a second image corresponding to a first image by performing motion compensation using the generated motion information, the second image being a reference image after motion compensation, and the first image being a reference image before motion compensation;
   calculating a flatness degree of the input image;
   calculating addition rates for the input image, the first image, and the second image, using the calculated flatness degree; and
   generating an image that is to be an output image by adding the input image, the first image, and the second image according to the addition rates calculated for the respective images that are the input image, the first image, and the second image.

9. A non-transitory computer-readable recording medium having a program recorded thereon which is for executing image processing of removing noise in an input image by adding a reference image to the input image, the program causing a computer to execute:

generating motion information indicating a motion estimated for the input image;

generating a second image corresponding to a first image by performing motion compensation using the generated motion information, the second image being a reference image after motion compensation, and the first image being a reference image before motion compensation;

calculating a flatness degree of the input image;

calculating addition rates for the input image, the first image, and the second image, using the calculated flatness degree; and generating an image that is to be an output image by adding the input image, the first image, and the second image according to the addition rates calculated for the respective images that are the input image, the first image, and the second image.

10. An integrated circuit which removes noise in an input image by adding a reference image to the input image, said integrated circuit comprising:

a motion estimation unit configured to generate motion information indicating a motion estimated for the input image;

a motion compensation unit configured to generate a second image corresponding to a first image by performing motion compensation using the generated motion information, the second image being a reference image after motion compensation, and the first image being a reference image before motion compensation;

a flatness degree calculation unit configured to calculate a flatness degree of the input image;

a rate calculation unit configured to calculate addition rates for the input image, the first image, and the second image, using the calculated flatness degree; and a pixel addition unit configured to generate an image that is to be an output image by adding the input image, the first image, and the second image according to the addition rates calculated for the respective images that are the input image, the first image, and the second image.

* * * * *